A. K. HOFFMAN.
DENTAL TOOL.
APPLICATION FILED FEB. 1, 1913.
1,075,826.
Patented Oct. 14, 1913.
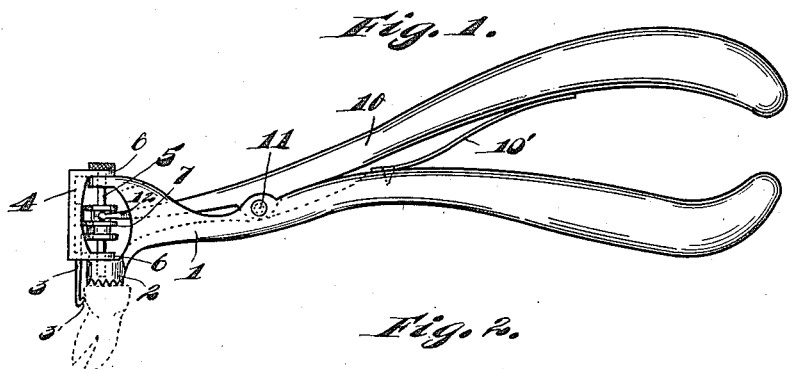
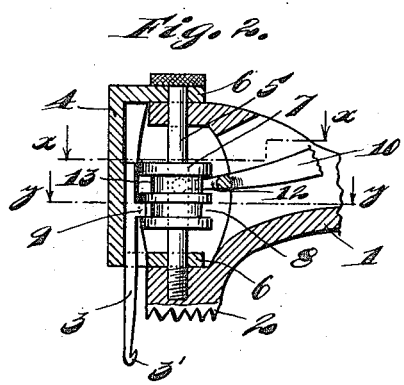
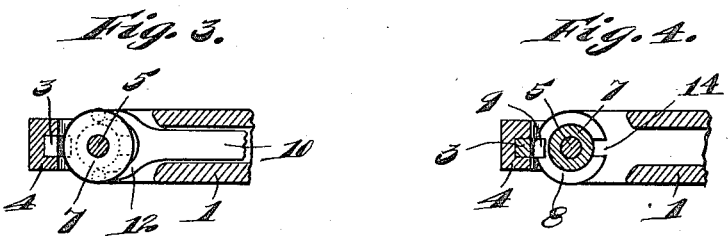
Witnesses:
Inventor:
Augustus K. Hoffman,
By Joshua R. H. Potts
his Attorney.

UNITED STATES PATENT OFFICE.

AUGUSTUS KNIGHT HOFFMAN, OF BENTON, WISCONSIN.

DENTAL TOOL.

1,075,826.   Specification of Letters Patent.   Patented Oct. 14, 1913.

Application filed February 1, 1913.  Serial No. 745,567.

*To all whom it may concern:*

Be it known that I, AUGUSTUS K. HOFFMAN, a citizen of the United States, and a resident of the city of Benton, county of Lafayette, and State of Wisconsin, have invented certain new and useful Improvements in Dental Tools, of which the following is a specification.

My invention relates to dental tools and more specifically to a tool designed for use by a dentist in removing the enamel from the base or root portion of a tooth preparatory to the application of a crown thereto.

The object of my invention is the production of a tool of the character mentioned through the medium of which the enamel of a tooth may be readily and expeditiously removed.

A further object is the production of a tool as mentioned which will be of durable and economical construction, one which may be readily and easily manipulated, and one which will be efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a tool embodying my invention, Fig. 2 is an enlarged central section of the forward end of the tool, and Figs. 3 and 4 are transverse sections taken on lines $x$—$x$ and $y$—$y$ respectively of Fig. 2.

The preferred form of construction as illustrated in the drawing comprises an elongated body or supporting member 1. The forward end of the member 1 is bifurcated, the base of said end being adapted to be rested upon the tooth which it is desired to operate upon, said base being serrated or otherwise roughened as at 2 so as to adapt the same to firmly engage the tooth and to insure against slipping. Arranged at said end of the member 1 is a scraping member 3 the lower end 3′ of which is hooked and pointed for engagement with the side of the tooth, as clearly shown in Fig. 1 (a tooth being here shown in dotted lines), and so that when the member 3 is drawn upwardly, said pointed end 3′ thereof will pierce the enamel of the tooth and cause the removal thereof. The upper end of the scraper member 3 is slidably mounted in a channel guide 4 which is pivotally secured in position by means of a pin 5 arranged in the forward end of the member 1 and which pin passes through perforated ears 6 formed at the respective extremities of said guide member. The arrangement is such, as will be observed, that guide member 4 is free for pivotal movement about the end of the member 1 so that, in use, the scraper member 4 may contact with the entire lateral surface of the tooth.

Actuation of the member 3 is secured through the employment of a cylindrical block 7 which is mounted for reciprocation upon the pin 5. The member 7 is provided with a circumferential groove 8 which is loosely engaged by a lug 9 formed at the inner side of the scraper 3, the arrangement being such that, when the member 7 is reciprocated, the scraper 3 will be carried thereby and thus actuated.

Reciprocation of the member 7 is effected through the medium of a lever 10 which is fulcrumed at 11 to the member 1. The forward bifurcated end 12 of the lever 10 engages a circumferential groove 13 formed in the upper end of the member 7, whereby, when the lever 10 is oscillated the member 7 and hence the scraper member 3 will be reciprocated. A leaf spring 10′ coöperates with the lever 10 to normally hold the same in a position in which the scraper member will be positioned at its lower terminal of movement, depression of the outer handle-forming end of the lever 10 causing upward or operative movement of the scraper.

The lower end portion of the block 7 is provided with a slot 14 which will permit of the passage of the lug 9 of the scraper member 3 in order to permit of detachment of the latter for repairing, sharpening or replacing the same. With this arrangement it will be seen that in attaching the scraper 3, the member 7 is turned to position the slot 14 in registration with the channel in member 4. When said slot is so positioned the lug 9, upon upward sliding of the upper end of the scraper 3 in the channel of member 4, will pass through said slot and so that when said member 7 is rotated to position the slot 14 out of registration with the channel in member 4, said scraper will be locked in position.

In use the tool is employed after the upper end of the tooth which is to be operated upon has been ground down so that the upper end thereof presents a flat surface as shown in Fig. 1, this being the usual practice. After this has been done the outer end of the tool is placed in the mouth and the base portion 2 thereof rested upon the tooth. When the outer end of the tool is thus positioned the lower end of the scraper will be positioned in engagement with the side of the tooth and so that upon oscillation of the handle 10 by the dentist, the scraper 3 will be vertically reciprocated causing the removal of the enamel from the tooth as above described. This tool is designed for use especially in operating upon teeth positioned at the rearward portion of the mouth, such as molars, which, with tools of the character used at the present, are not readily accessible. Through the employment of the tool described these otherwise inaccessible teeth may be operated upon with ease and the enamel removed therefrom with expedition.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A dental tool comprising means adapted to rest upon the tooth to be operated upon; a scraping member mounted for vertical reciprocation for engagement of the tooth upon which said first mentioned means is rested; and means for reciprocating said scraping member, substantially as described.

2. A dental tool comprising means adapted to rest upon the tooth to be operated upon; means for vertical reciprocation for engagement of the tooth upon which said first mentioned means is rested; and oscillatory means for actuating said scraping member, substantially as described.

3. A dental tool comprising means adapted to rest upon the tooth to be operated upon; means for vertical reciprocation for engagement of the tooth upon which said first mentioned means is rested; and an oscillatory lever for actuating said scraping member, substantially as described.

4. A dental tool comprising an elongated member one end of which is adapted to be rested upon the tooth to be operated upon; a vertically movable scraper arranged at one end of said elongated member; a guide member at said end of said elongated member; means mounted for reciprocation upon said guide member adapted when reciprocated to effect actuation of said scraper; and manually operable means engaging said last mentioned means for reciprocating the same, substantially as described.

5. A dental tool comprising an elongated member one end of which is adapted to be rested upon the tooth to be operated upon; a vertically movable scraper arranged at one end of said elongated member; a guide member at said end of said elongated member; means mounted for reciprocation upon said guide member adapted when reciprocated to effect actuation of said scraper; and an elongated oscillatory lever engaging said last mentioned means for reciprocating the same, substantially as described.

6. A dental tool comprising an elongated member one end of which is adapted to be rested upon the tooth to be operated upon; a vertically movable scraper arranged at one end of said elongated member; a guide for said scraper pivotally secured to one end of said elongated member in which said scraper is reciprocatingly mounted; and an oscillatory lever for reciprocating said scraper, substantially as described.

7. A dental tool comprising an elongated member one end of which is adapted to be rested upon the tooth to be operated upon, said end of said member being bifurcated; a vertically movable scraper arranged at one end of said member having its lower end hooked and projecting below the base of said member; a channel guide for said scraper pivotally secured to said end of said elongated member in which said scraper is reciprocatingly mounted; a pin arranged at said end of said elongated member; a block slidably mounted upon said pin; a lug on said scraper engaging a groove in said block so that when said block is moved on said guide pin said scraper will be actuated; and an oscillatory lever pivotally mounted upon said elongated member engaging said block for operating the same, substantially as described.

In testimony whereof I have signed my name to this specification in the presence of two subscribing witnesses.

AUGUSTUS KNIGHT HOFFMAN.

Witnesses:
 EDUARD G. MILLER,
 R. E. WILKINSON.

---

Copies of this patent may be obtained for five cents each, by addressing the " Commissioner of Patents, Washington, D. C."